United States Patent Office.

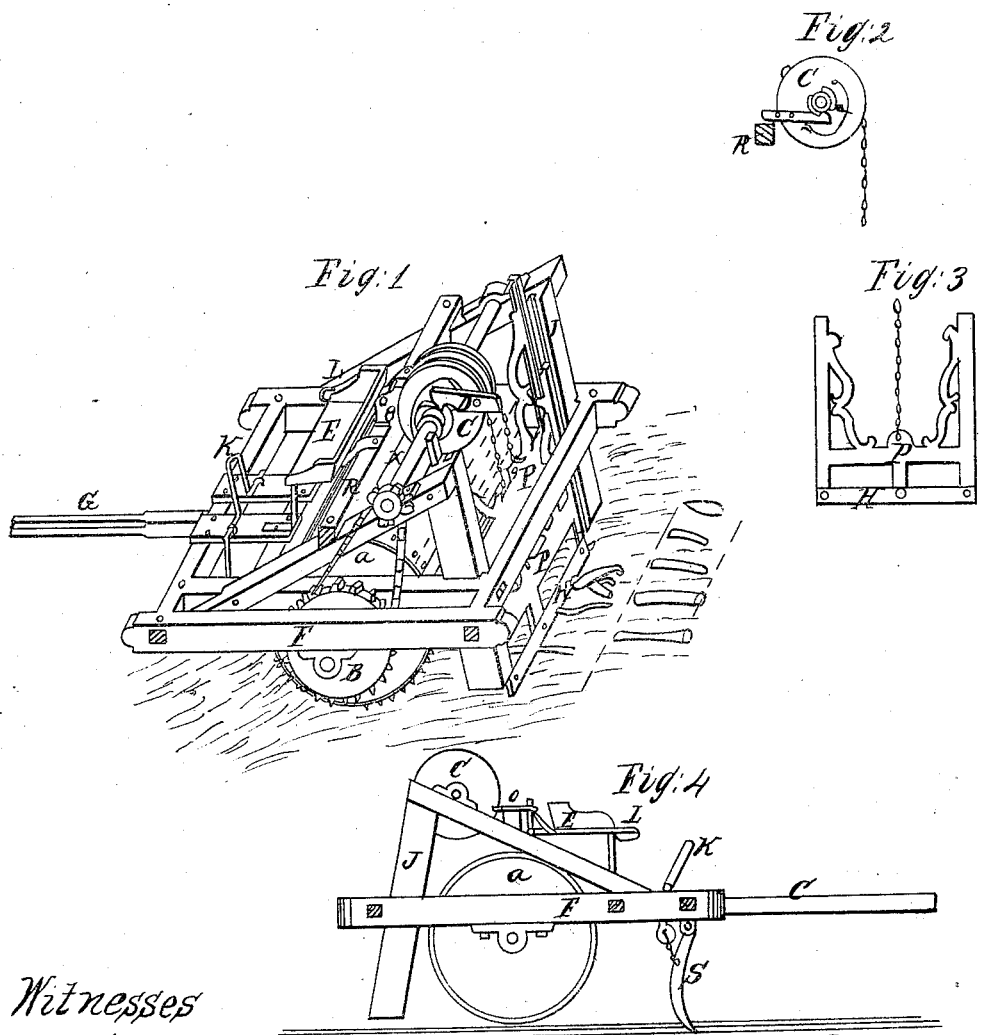

PHINEAS H. TOMPKINS AND ELZA DOUGAL, OF VAN BUREN, IOWA.

Letters Patent No. 91,581, dated June 22, 1869.

IMPROVEMENT IN GROUND-ROLLER AND STALK-CUTTER.

The Schedule referred to in these Letters Patent and making part of the same.

*To all whom it may concern:*

Be it known that we, PHINEAS H. TOMPKINS and ELZA DOUGAL, of the township of Van Buren, in the county of Jackson, State of Iowa, have invented a new and useful Machine for Rolling the Ground and Cutting Stalks; and we do hereby declare that the following is a full, clear, and exact description thereof, reference being had to the accompanying drawings, and to letters of reference marked thereon.

The nature of our invention consists in so constructing and arranging the machine that the roller flattens down the stalks, and vertical knives, operated in a sash, are made to fall upon the stalks and cut them into short pieces, so that they can be readily plowed under.

To enable others to make and use our invention, we will describe its construction and operation, first calling attention to the drawings.

Figure 1 represents a perspective view.
Figure 2 represents catch to operate knives.
Figure 3 represents face view of knife and frame.
Figure 4 represents end elevation.

We construct roller *a* of any desired size, and attach on the shaft a cog-wheel, as at B.

This cog-wheel, by means of a chain-belt, gives motion to shaft *x*.

To this shaft are fixed two collars, fitted with a catch, as indicated at C.

There is loose on this shaft *x* a pulley or wheel, to which is attached a catch-dog, marked D. Also, on the outer edge of these wheels are attached chains or cords, that are fastened to the knife-frame P P. Also, to the wheel D is attached a steel spring, marked Z. This spring forces the dog D down on to the collar, causing it to catch in the notch.

The operation is as follows:

The team is attached to the tongue G, and as the machine is drawn along, the roller B turns and gives motion to the shaft *x* and the collars that are made fast thereto. The spring Z keeps the dog D close on the collar, and as the collar comes round the notch in it catches on the dog D, which, being fast to wheel C by a pin, it turns the wheel, on which is fastened the chain, and as it turns over it comes in position, as shown at fig. 2; and when the dog strikes the cross-piece R it is unlocked from the collar on the shaft, and the wheel being loose, the weight of the sash and knife turns it back, and the knife descends to the ground, cutting any stalks on which it descends. Thus, as the machine is drawn along, this operation is repeated, and as many motions given to the knife as there are catches in the collar.

These knives are arranged to work alternately, and work in a guide marked J.

To use as a roller only, we have a lock, shown at L and O. A piece on cross-piece R, by means of lever L, is forced into notches in wheels, and allows the shaft to turn and not operate the knives.

Where ground is uneven, we hang the sash J at top, and allow it to swing a short distance.

What we claim as our invention, and desire to secure by Letters Patent, is—

The combination and arrangement of the roller *a*, wheel B, shaft *x*, with its collars, the dog D, spring Z, wheels C, knives H, guides J, sashes P P, all when constructed and used substantially as and for the purposes above set forth.

PHINEAS H. TOMPKINS.
ELZA DOUGAL.

Witnesses:
WM. W. SANBORN,
T. G. PELTON.